United States Patent

Melde-Tuczai et al.

[11] Patent Number: 4,854,270
[45] Date of Patent: Aug. 8, 1989

[54] INTAKE SYSTEM FOR INTERNAL COMBUSTION ENGINES

[75] Inventors: Helmut Melde-Tuczai; Johann Wagner, both of Graz; Günter Fraidl, Pirka, all of Austria

[73] Assignee: A V L Gesellschaft fur Verbrennungskraftmaschinen Und Messtechnik M.B.H., Prof. Dr.Dr.h.c. Hans List, Graz, Austria

[21] Appl. No.: 242,204
[22] Filed: Sep. 9, 1988

[30] Foreign Application Priority Data
Sep. 11, 1987 [AT] Austria .................. 2311/87

[51] Int. Cl.⁴ .......................................... F02B 75/18
[52] U.S. Cl. ................... 123/52 M; 123/432; 123/308
[58] Field of Search ......... 123/52 M, 52 MB, 52 MC, 123/432, 308

[56] References Cited
U.S. PATENT DOCUMENTS

| | | | |
|---|---|---|---|
| 3,177,854 | 4/1965 | Garcea | 123/52 M |
| 3,491,733 | 1/1970 | Soubis | 123/52 M |
| 3,814,069 | 6/1974 | Croft | 123/52 M |
| 4,446,823 | 5/1984 | Bessho | 123/52 MB |
| 4,590,895 | 5/1986 | Yada et al. | 123/52 MB |
| 4,617,897 | 10/1986 | Sasaki et al. | 123/432 |
| 4,619,226 | 10/1986 | Ueda et al. | 123/52 MC |
| 4,726,329 | 2/1988 | Atkin | 123/52 MB |

FOREIGN PATENT DOCUMENTS
3521747 12/1985 Fed. Rep. of Germany.
1395660 3/1965 France.

Primary Examiner—E. Rollins Cross
Attorney, Agent, or Firm—Watson, Cole, Grindle & Watson

[57] ABSTRACT

An intake system for internal combustion engines, comprising suction pipes of different lengths, which can be connected individually—preferably in accordance with the engine speed—to the intake passage in the cylinder head leading to the intake valve. The main intake pipe is connected to each intake passage by means of a connecting piece, and three suction passages of different lengths departing from the main intake pipe open into this connecting piece either in the direction of its axis or on opposite sides thereof, the connecting piece containing a butterfly control valve which is centrally mounted on a shaft parallel to the longitudinal axis of the engine, and which—in its two extreme positions and in its center position—establishes the flow connection between one of the suction passages and the intake passage.

3 Claims, 2 Drawing Sheets

INTAKE SYSTEM FOR INTERNAL COMBUSTION ENGINES

BACKGROUND OF THE INVENTION

This invention relates to an intake system for internal combustion engines with two suction pipes of different lengths departing from a main intake pipe, which pipes can be connected individually, preferably in accordance with the engine speed, to the intake passage in the cylinder head leading to the intake valve, the main intake pipe being connected to each intake passage by a connecting piece, and the suction pipes of different lengths departing from the main intake pipe opening into this connecting piece in the direction of the axis of the connecting piece, or on opposite sides thereof, and a butterfly control valve being arranged in the connecting piece, which valve is positioned on a shaft parallel to the longitudinal axis of the engine, and which in two positions, i.e., its two extreme positions, establishes the flow connection between one of the suction pipes and the intake passage and disconnects the flow connection between the other suction pipe and the intake passage.

DESCRIPTION OF THE PRIOR ART

Such a system, which is presented and described in French Pat. No. 1 395 660, for instance, is operated with a flap-type control valve supported on one side, by which the two suction pipes of different lengths departing from the main intake pipe can be connected to the intake passage, i.e., one in each end position of the flap. Such control flaps necessitate comparatively large actuating forces—and thus amplifying devices—if special demands are made with regard to the control of the intake passage. The sudden changes in flow cross-section entail comparatively high flow-losses.

In German Laid Open No. 35 21 747 an intake system is presented in which the intake passage in the cylinder head is connected with a main section of the intake system containing a throttle valve. A high-velocity intake passage of relatively small length and a low-velocity intake passage of relatively large length both are connected to the main section of the intake line adjacent to the cylinder head, the high-velocity passage being provided with a throttle valve. For selection of the suitable intake passage the throttle valve is opened for high-velocity operation of the engine and closed for low-velocity operation. Thus two throttle valves are necessary for operation of this intake system, which is complicated and expensive. Other systems known are continuously adjustable, which in engines with a wide r.p.m. range will ensure that an optimum torque curve or volumetric efficiency curve is established over the entire r.p.m. range. Such continuously adjustable systems are characterized by considerable complexity of design, however, which makes them failure-prone and often uneconomic.

SUMMARY OF THE INVENTION

It is an object of the invention to avoid the disadvantages of the known systems while attaining a wider r.p.m. range with an optimum torque curve in a simple way.

In the invention this object is achieved by establishing a direct flow connection between the main intake pipe and the connecting piece situated between the entry openings of the suction pipes into the connecting piece, and by mounting the control valve such that it is centered on the shaft (butterfly-type), thus providing a center position in addition to its extreme positions, such that the shortest flow-connection is established between the main intake pipe and the intake passage in the cylinder head. As compared to previous designs this variant has the advantage that it is simple, inexpensive and robust, permitting up to three suction passages of different lengths to be obtained by means of a single valve per cylinder, which will improve the torque curve over the entire r.p.m. range. With this system three different lengths of suction passage may be optionally selected in a simple manner, resulting in an optimum torque curve.

In order to make one of the suction passages as long as possible the invention provides that the suction pipes of different lengths coil around the main intake pipe, at least one of them being wound helically around the main intake pipe.

The invention finally provides that the interior walls of the suction pipes coiled around the main intake pipe be constituted by the exterior walls of the main intake pipe.

BRIEF DESCRIPTION OF THE DRAWINGS

Further features of the invention are indicated in the description of some variants of the invention following below.

DETAILED DESCRIPTION OF THE PREFERRED EMBODIMENTS

Figure 1:
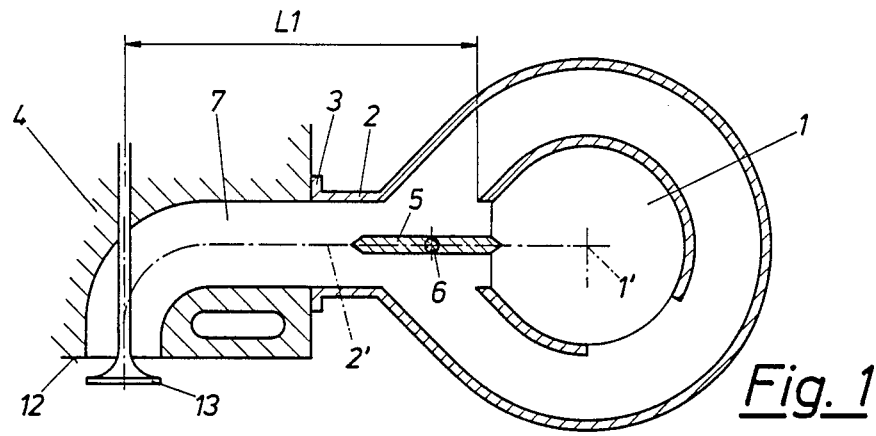
FIGS. 1 to 3 show an intake system according to the invention, with three different positions of the control valve.
Figure 2:
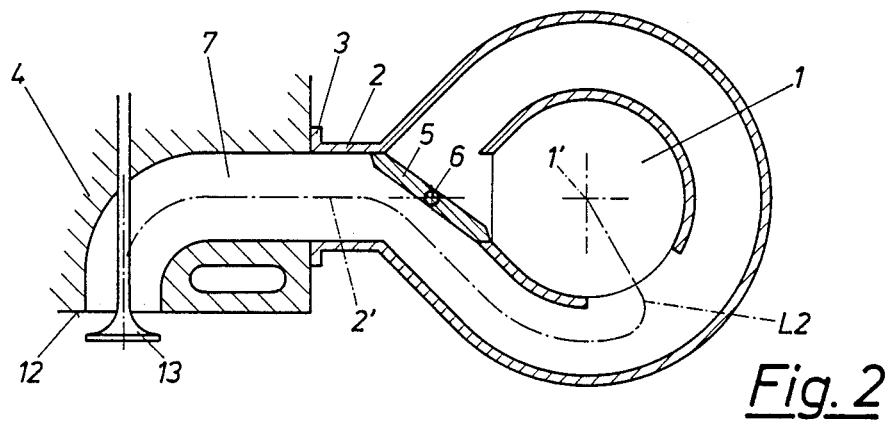
Figure 3:
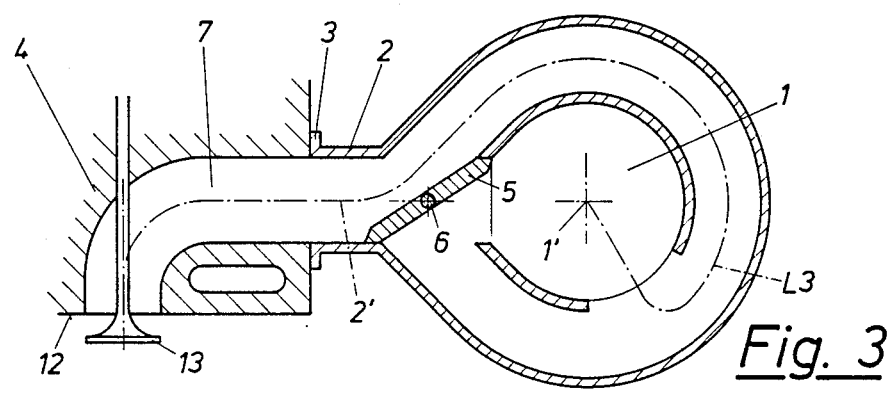

In the variant of the invention presented in FIGS. 1 to 3 the intake system comprises the main intake pipe 1, the connecting piece 2 which is sealingly attached to the cylinder head 4 by means of a flange 3. In the connecting piece 2 a butterfly control valve 5 is provided for each cylinder, which is rigidly mounted on the shaft 6 parallel to the longitudinal axis of the engine. In a multicylinder internal combustion engine with cylinders in line this shaft 6 passes through all intake connecting pieces and is actuated by an adjusting element not to be discussed here in detail, as part of the engine control system. The butterfly control valve 5 can be fixed in three positions and is thus capable of connecting any one of three different passage lengths to the intake passage 7 in the cylinder head 4. In the center position of the butterfly control valve 5 shown in FIG. 1 the passage length L1 is activated, in the valve position shown in FIG. 2 the passage length L2, and in the valve position shown in FIG. 3 the passage length L3. Each length of the suction passage is measured from the axis 1' of the main intake pipe 1 to the seat 12 of the intake valve 13. The axis of the connecting piece 2 is marked 2'. The butterfly control valve 5 lies along this axis in the position given in FIG. 1.

Figure 4:
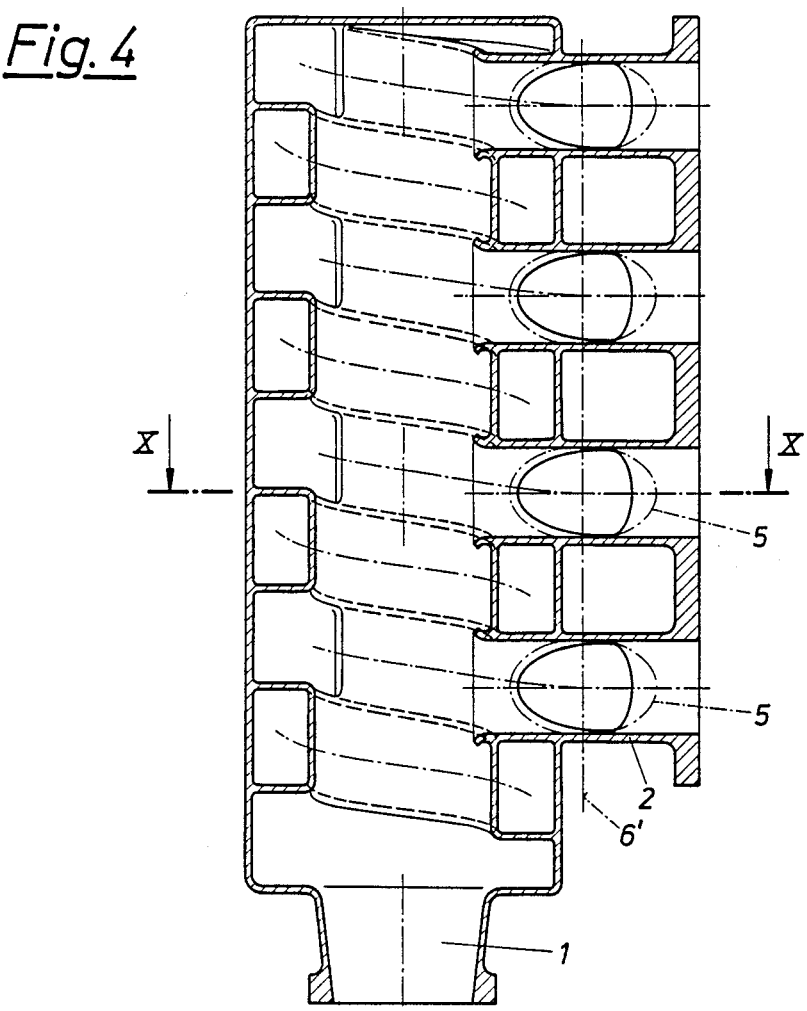
FIGS. 4 to 5 show a further variant of the invention, FIG. 4 presenting an axial section and FIG. 5 a cross-section along line X—X in FIG. 4.
Figure 5:
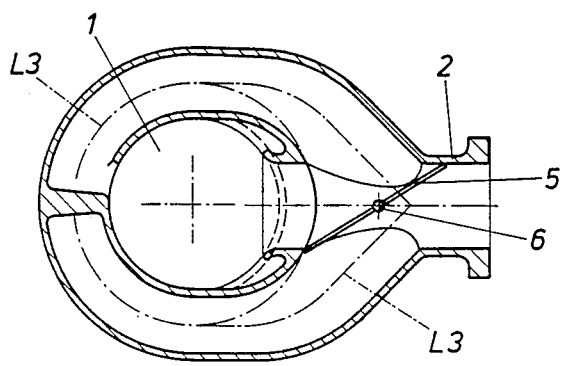

In the variant presented in FIGS. 4 and 5 the suction passage L3 winds helically around the main intake pipe 1 in order to ensure maximum length without increasing the overall dimensions of the system the intake system shown here is part of a four-cylinder in-line engine with the control valves 5 sitting on a common shaft whose axis is marked 6'.

We claim:

1. An intake system for internal combustion engines with two suction pipes of different lengths departing from a main intake pipe, said suction pipes are connected individually, in accordance with the engine speed to an intake passage in a cylinder head leading to an intake valve, said main intake pipe being connected to each of said intake passages by a connecting piece defining an axis, and said suction pipes of different lengths departing from said main intake pipe opening into said connecting piece having entry openings situated on opposite sides of said axis of said connecting piece, a butterfly control valve being arranged in said connecting piece, being positioned on a shaft parallel to said main intake pipe, said control valve in two extreme positions establishes a flow connection between one of said suction pipes and said intake passage and disconnects a flow connection between the other of said suction pipes and said intake passage, wherein a direct flow connection is established between said main intake pipe and said connecting piece, situated between said entry openings of said suction pipes into said connecting piece, and wherein said control valve is mounted so as to be centered on said shaft (butterfly-type), thus providing a center position in addition to said extreme positions, such that a shortest flow-connection is established between said main intake pipe and said intake passage in said cylinder head.

2. An intake system according to claim 1, wherein said suction pipes of different lengths are coiled around said main intake pipe and at least one of said pipes being wound helically around said main intake pipe.

3. An intake system according to claim 2, wherein interior walls of said suction pipes coiled around said main intake pipe are constituted by exterior walls of said main intake pipe.

* * * * *